(12) United States Patent
Ambrose et al.

(10) Patent No.: US 6,288,199 B1
(45) Date of Patent: Sep. 11, 2001

(54) BLOCKED ISOCYANATE-BASED COMPOUNDS AND COMPOSITIONS CONTAINING THE SAME

(75) Inventors: Ronald R. Ambrose, Allison Park; William H. Retsch, Jr., Castle Shannon; Anthony M. Chasser, Glenshaw, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/431,787

(22) Filed: Nov. 2, 1999

(51) Int. Cl.$^7$ .................................................. C08G 18/81
(52) U.S. Cl. .............................. 528/45; 528/44; 528/80; 528/83; 528/85; 560/24; 560/25; 560/26; 560/330; 560/354
(58) Field of Search .................... 528/45, 44, 80, 528/83, 85; 560/24, 25, 26, 330, 354

(56) References Cited

U.S. PATENT DOCUMENTS

| | | |
|---|---|---|
| 3,979,477 | 9/1976 | Schmid et al. . |
| 3,985,825 | 10/1976 | Schmid et al. . |
| 3,991,034 | 11/1976 | Takeo et al. . |
| 4,000,214 | 12/1976 | Lum et al. . |
| 4,554,343 | 11/1985 | Jackson, Jr. et al. ................. 528/274 |
| 4,578,453 | 3/1986 | Jackson, Jr. et al. ................. 528/302 |
| 4,755,623 | 7/1988 | Dileone ................................ 564/160 |
| 5,097,006 | 3/1992 | Kapilow et al. ..................... 528/272 |
| 5,262,494 | 11/1993 | Smith et al. ......................... 525/443 |
| 5,376,460 | 12/1994 | Hardeman et al. .................. 428/482 |
| 5,777,061 * | 7/1998 | Yonek et al. ........................... 528/45 |
| 5,786,437 * | 7/1998 | Nicholas ................................. 528/45 |
| 5,925,698 | 7/1999 | Steckel .................................. 524/322 |
| 6,051,674 * | 4/2000 | Yezrielev et al. ....................... 528/45 |
| 6,103,826 * | 8/2000 | Jones et al. ............................. 528/45 |
| 6,111,048 * | 8/2000 | Asahini et al. ......................... 528/45 |

FOREIGN PATENT DOCUMENTS

| | | |
|---|---|---|
| 17771/95 | 11/1995 | (AU) . |
| 0 899 314 A1 | 3/1999 | (EP) . |
| 98/04608 | 2/1998 | (WO) . |
| 00/06461 | 2/1999 | (WO) . |

OTHER PUBLICATIONS

New Outdoor Durable Powder Coatings, Francesc Williams, et al., pp. B–73, B–75–B–89. (1998).

New Developments in the Field of Blocked Isocyanates, Zeno W. Wickes, Jr., Progress in Organic Coatings, p. 20. (1981).

Liquid Crystal Block Copolyesters. 2. Preparation and Properties of Block Copolyesters Containign Cyclohexane and Benzene Rings, Polk et al. Macromolecules (1981,) 14 (6), 1626–1629.

Liquid Crystal Block Copolyesters. 3. Isomerization Polymerization of Block Copolyesters Containing Cyclohexane and Benzene Rngs, Macromolecules (1984,) 1 (2), 129–134.

* cited by examiner

Primary Examiner—John Cooney
(74) Attorney, Agent, or Firm—William J. Uhl

(57) ABSTRACT

The invention provides novel isocyanate-based compounds. Such novel compounds can be used in essentially all applications where conventional isocyanate-based compounds are employed. In other words, the novel isocyanate-based compounds can be used in the making of liquid and powder coating compositions, adhesives, rigid and moldable plastics and foams. The isocyanate-based compounds of the present invention include a polyfunctional isocyanate compound which is at least partially blocked with at least one of the following: a polyhydroxy aromatic compound, or a mixture of a polyhydroxy aromatic compound and a hydroxy-functional ester compound. The present invention further provides compositions which include the aforementioned novel isocyanate-based compound as a component. These compositions can be in the form of liquid coating compositions, powder coating compositions, powder slurry coating compositions, plastic compositions, adhesive compositions, or polymeric foam compositions.

8 Claims, No Drawings

BLOCKED ISOCYANATE-BASED COMPOUNDS AND COMPOSITIONS CONTAINING THE SAME

FIELD OF THE INVENTION

The present invention relates to new, blocked isocyanate-based compounds. The invention also relates to a new family of polymeric compositions made with these blocked isocyanate-based compounds.

BACKGROUND OF THE INVENTION

Blocked isocyanate compounds which react at elevated temperature with compounds containing active hydrogen atoms to produce three-dimensional or networked polymers by forming crosslinks between preformed molecules are known and are described, for example in Houben-Weyl, *Methoden der Organischen Chemie*, Vol. XIV/2, pages 61–70, or in Z. W. Wicks, Jr., *Progress in Organic Coatings* 9, 3–28 (1981). For example, liquid and powder coating compositions, adhesives, rigid and moldable plastics and foams comprising, among other things, a blocked isocyanate-based compound have been employed in almost every manufacturing industry. Conventional blocking agents for isocyanate compounds include phenols, caprolactam, oximes and CH-acid compounds such as acetoacetic acid esters and malonic acid dialkyl esters.

Blocked isocyanate-based compound have been used in combination a wide variety of polyols to produce polyurethanes. Such polyurethanes can be formed into rigid and flexible foamed articles, sheets, high density sheets and articles of various shapes. Moreover, the light stability of such polyurethanes makes them extremely useful in liquid and powder coatings, as well as being useful in other applications where light stability is desirable.

Although blocked isocyanate-based compounds are known, the various manufacturing industries which employ the same are continually searching for new compounds of this type.

SUMMARY OF THE INVENTION

One object of this invention is to provide novel isocyanate-based compounds which can be used as crosslinkers.

Another object of this invention are polymeric compositions which include novel isocyanate-based compounds as crosslinkers.

The novel isocyanate-based compounds of the present invention can be used in essentially all applications where conventional isocyanate-based compounds are employed. In other words, the isocyanate-based compounds of the present invention can be used in the making of liquid and powder coating compositions, adhesives, rigid and moldable plastics and foams.

The achievement of this and other objects will become apparent to those skilled in the art after reading this specification. The isocyanate-based compounds of the present invention include a polyfunctional isocyanate compound which is at least partially blocked with at least one of the following: a polyhydroxy aromatic compound, or a mixture of a polyhydroxy aromatic compound and a hydroxy-functional ester compound.

DETAILED DESCRIPTION OF THE INVENTION

The novel isocyanate-based compounds of the present invention comprise a polyfunctional isocyanate which is at least partially blocked with at least one of the following: a polyhydroxy aromatic compound, or a mixture of a polyhydroxy aromatic compound and a hydroxy-functional ester compound.

Although blocked isocyanates are known to those skilled in the art, what is not known is that these types of compounds can adequately function when they are at least partially blocked in the manner set out below. Specifically, in accordance with the present invention, the novel isocyanate-based compounds are at least partially blocked with at least one of the following: a polyhydroxy aromatic compound, or a mixture of a polyhydroxy aromatic compound and a hydroxy-functional ester compound.

As used herein, the term "polyhydroxy aromatic compound" includes compounds having at least one of the following structures:

$$HO-\Phi^1-R^1-\Phi^1-OH \qquad (I)$$

where $\Phi^1$ is an aromatic-containing compound which comprises a phenyl group, and $R^1$ is an alkyl group having 0 to 4 carbon atoms, or

$$HO-\Phi^2-OH \qquad (II)$$

where $\Phi^2$ is an aromatic containing compound which comprises a phenyl group or a naphthyl group.

Examples of the polyhydroxy aromatic compounds which are encompassed by structure (I) include: diphenols such as 4,4'-isopropylidenediphenol (e.g., BISPHENOL™ A, commercially available from Dow Chemical Co) and bis (4-hydroxyphenyl) methane (e.g., BISPHENOL™ F, also commercially available from Dow Chemical Co). Examples of polyhydroxyl aromatic compounds which are encompassed by structure (II) include: dihydroxynaphthalene, hydroxy phenols such as resorcinol, and derivatives thereof. In certain preferred embodiments of this invention, the polyhydroxy aromatic compound comprises 4,4'-isopropylidene-diphenol.

As used herein, the term "hydroxy-functional ester compound" includes compounds having the following structure:

$$COOR^2-\Phi^2-OH \qquad (III)$$

where, $R^2$ is an alkyl group having from 1 to 4 carbon atoms, and $\Phi^2$ is an aromatic containing compound which comprises a phenyl group or a naphthyl group.

In structure (III), although $\Phi^2$ is an aromatic containing compound which comprises a phenyl group or a naphthyl group, in certain preferred embodiments, $\Phi^2$ is an aromatic containing compound which comprises a phenyl group.

Examples of the hydroxy-functional ester compounds which are encompassed by structure (III) include: methyl 4-hydroxy benzoate, methyl 3-hydroxy benzoate, and the like. In certain preferred embodiments of this invention, the hydroxy-functional ester compound comprises methyl 4-hydroxy benzoate.

As stated above, the polyhydroxy aromatic compounds encompassed by structures (I) and (II) can be used exclusively as blocking agents for the novel isocyanate-based compounds of the present invention. However, in certain preferred embodiments, the novel isocyanate-based compounds are at least partially blocked with a blend of the polyhydroxy aromatic compound(s) and the hydroxy-functional ester compound(s) encompassed by the following structures: (I) and (III); (II) and (III); and/or (I), (II) and (III).

In the embodiments wherein the novel isocyanate-based compounds are at least partially blocked with a blend of the polyhydroxy aromatic compound(s) and the hydroxy-functional ester compound(s), the ratio of the polyhydroxy aromatic compound(s) to the hydroxy-functional ester compound(s) typically ranges from about 0.01:1 to about 1.4:1. In certain embodiments where a blend of these blocking agents are employed, the ratio of the polyhydroxy aromatic compound(s) to the hydroxy-fumctional ester compound(s) preferably ranges from about 0.05:1 to about 1:1.2, and more preferably, from about 0.10:1 to about 1:1.

When at least partially blocking the novel isocyanate-based compounds in accordance with certain embodiments of the present invention, the total amount of the blocking agent(s) employed are such that there exists from about 1.5 to about 0.6 hydroxyl equivalents of the blocking agent(s) per equivalent of free NCO in the isocyanate-based compound. In certain preferred embodiment, the total amount of the blocking agent(s) employed are such that there exists from about 1.3 to about 0.7 hydroxyl equivalents of the blocking agent(s) per equivalent of free NCO in the isocyanate-based compounds; and more preferably, from about 1.1 to about 0.9 hydroxyl equivalents of the blocking agent(s) per equivalent of free NCO in the isocyanate-based compounds.

Any suitable polyfunctional isocyanate can be at least partially blocked in accordance with this invention. In one embodiment, the polyfunctional isocyanate is derived from a polyisocyanate (i.e., an isocyanate possessing at least two isocyanate functions, advantageously more than two) which is itself typically derive from a precondensation or from a prepolymerization of elemental isocyanates. Elemental isocyanates include those made of hydrocarbon skeletons having at least two isocyanate functions. These hydrocarbon skeletons are often an arylene radical, an alkylene radical (including an aralkylene radical) such as the polymethylenes (e.g., hexamethylene), or the necessary to form isophorone diisocyanate (IPDI). The hydrocarbon skeletons may also be alkyl(s) or arylic.

The atomic weight of these elemental isocyanates is advantageously at most 500; and preferably at most 300. Moreover, the average molecular weights of the prepolymers or precondensates is not more than 5000; and more commonly not more than 3000.

The polyisocyanates that may be used when practicing this invention include those of the biuret type and those for which the di- or trimerization reaction has produced four-, five- or six-membered rings. Among the six-membered rings, there may be mentioned the isocyanuric rings derived from a homo- or hetero- trimerization of various diisocyanates alone, with other isocyanate(s) (e.g., mono-, di- or polyisocyanate(s)) or with carbon dioxide. In this latter case, a nitrogen from the isocyanuric ring is replaced by an oxygen.

In certain preferred embodiments, the polyisocyanates which can be employed include those which have at least one aliphatic isocyanate function. In other words, at least one isocyanate function blocked in accordance with this invention is attached to the hydrocarbon skeleton via an $sp^3$-type carbon advantageously bearing at least one hydrogen atom, preferably two.

It is preferable to choose compounds according to the present invention such that they react completely with a primary alcohol. The reaction is considered to be complete if it is achieved to 80% or more.

In certain embodiments, the preferred isocyanates are those wherein the nitrogen atom is attached to an $sp^3$-hybridized carbon; and more particularly, to aliphatic isocyanates; and especially, to polymethylene diisocyanates and the various condensation derivatives thereof (biuret, etc.) and di- and trimerization derivatives thereof.

When practicing this invention, it is sometimes preferable for the percentage of residual free isocyanate function to be not more than about 10%; preferably, not more than about 5%; and more preferably, not more than about 3%. The highest melting points or glass transition temperatures are typically obtained with percentages not exceeding about 1%.

In other embodiments, the polyfunctional isocyanates comprises trimers. If the implementation of trimers is preferred, examples of such that can be employed include: isocyanurates from isophorone diisocyanate or hexamethylene diisocyanate; and/or biurets from hexamethylene diisocyanate.

If an isocyanurate from isophorone diisocyanate is employed as the polyfunctional isocyanate, it can be prepared by any suitable manner known to those skilled in the art. One example of a manner in which an isocyanurate from isophorone diisocyanate can be prepared includes the trimerization of the IPDI in the presence of a suitable catalyst system. Thereafter, the remaining NCO groups are at least partially blocked as set out below.

A first reaction step of such a process (i.e., the catalytic trimerization) does not yield a uniform product. Rather, it produces various oligomers of IPDI which contain at least one isocyanurate ring and at least 3 free NCO groups. These products are hereinafter referred to as "IPDI - isocyanurates".

One example of a suitable catalyst system that can be used to trimerize the IPDI comprises 1,4-diazabicyclo(2,2,2)-octane/1,2-epoxypropane. The trimerization may be carried out with or without inert organic solvents. In some instances, it is desirable to terminate the trimerization reaction when the NCO content of the mixture reaches a certain level. For example, in some instances, it is desirable to terminate the trimerization when 30 to 50% of the NCO groups have reacted in the trimerization reaction. Under these circumstances, the unreacted IPDI can be separated from the isocyanurate by thin film distillation.

As opposed to formulating IPDI - isocyanurates in one of a number of known procedures such as the one set out above, IPDI - isocyanurates are also commercially available. For example, IPDI - isocyanurates which can be employed include the following: VESTANAT™ T-1890 isocyanurate commercially available from Creanova Corporation, and DESMODUR™ Z4470 BA isocyanurate commercially available from Bayer Corporation.

The novel isocyanate-based compounds of the present invention can be diisocyanates, triisocyanates or a mixture of diisocyanates and triisocyanates. In the embodiment wherein a mixture of diisocyanate and triisocyanate compounds are employed, the triisocyanate concentration is typically at least about 25 percent. In certain embodiments, if a blend of diisocyanates and triisocyanates is employed, the triisocyanate content is preferably at least about 50 percent; and more preferably at least about 75 percent.

As stated above, the novel isocyanate-based compounds of the present invention can be used where ever conventional blocked isocyanate-based compounds are employed. This include, for example, their use in the making of liquid and powder coating compositions, adhesives, rigid and moldable plastics and foams.

EXAMPLES

Having generally described this invention, a further understanding can be obtained by reference to certain specific examples which are provided herein for purposes of illustration only. These examples are not intended to unduly limit the scope of the claimed invention.

Unless otherwise stated, the IPDI - isocyanurate employed in the examples was VESTANAT™ T-1890 isocyanurate commercially available from CreaNova Corporation.

Example 1

Preparation of Isocyanate-Based Compounds

This Example demonstrates the preparation of a isocyanate-based compounds made in accordance with the present invention.

Preparation of Crosslinker A

A blocked isocyanate was prepared by mixing 1.7 moles of the IPDI trimer with 4.0 moles methyl p-hydroxybenzoate and 0.7 moles Bisphenol A. These materials were mixed as an 80% solids solution in butyl acetate and in the presence of 0.04 wt. % of dibutyl tin dilaurate.

The components were charged into a reactor and mixed under a nitrogen atmosphere. While still under the nitrogen atmosphere, the mixture was then heated to 90° C. and maintained at that temperature until there were no free isocyanate groups remaining. Thereafter, the solvent was removed by distillation under reduced pressure to yield the desired product hereinafter referred to as Crosslinker A.

Preparation of Crosslinker B

A blocked isocyanate was prepared by mixing 3.3 moles of the IPDI trimer with 10.5 moles methyl p-hydroxybenzoate. These materials were mixed as an 80% solids solution in butyl acetate and in the presence of 0.04 wt. % of dibutyl tin dilaurate.

The components were charged into a reactor and mixed under a nitrogen atmosphere. While still under the nitrogen atmosphere, the mixture was then heated to 90° C. and maintained at that temperature until there were no free isocyanate groups remaining. Thereafter, the solvent was removed by distillation under reduced pressure to yield the desired product hereinafter referred to as Crosslinker B.

Preparation of Crosslinker C

A blocked isocyanate was prepared by mixing 1.0 moles of the HDI Biuret (commercially available as DESMODUR™ N-100) with 2.3 moles methyl p-hydroxybenzoate and 0.4 moles Bisphenol A. These materials were mixed as an 70% solids solution in butyl acetate and in the presence of 0.04 wt. % of dibutyl tin dilaurate.

The components were charged into a reactor and mixed under a nitrogen atmosphere. While still under the nitrogen atmosphere, the mixture was then heated to 90° C. and maintained at that temperature until there were no free isocyanate groups remaining. Thereafter, the solvent was removed by distillation under reduced pressure to yield the desired product hereinafter referred to as Crosslinker C.

Example 2

Preparation of Polymeric Resins

This Example demonstrates the preparation of polymeric resins which can react with the isocyanate-based compounds of the present invention to form curable coating compositions.

Preparation of Resin A

The following compounds were placed into a 5-liter flask equipped with a stirrer, thermometer, nitrogen inlet tube, and distillation column:

| COMPOUND | AMOUNT (grams) |
|---|---|
| 1,4-Cyclohexanedimethanol | 1048 |
| Tris(2-hydroxyethyl)isocyanurate | 254 |
| Hexahydrophthalic anhydride | 1240 |
| Dibutyl tin oxide | 2.4 |
| Triisodecylphosphite | 2.4 |

A nitrogen stream was passed over the top of the compounds while the temperature was raised to about 230° C. After the compounds had melted, the nitrogen stream was placed below the surface of the mixture. The mixture was held at about 230° C. for about 18 hours. During this period, the water of condensation was removed from the mixture through the distillation column.

After the 18-hour period, the reactor's contents were poured onto metal trays and allowed to cool to room temperature. When cooled, the contents formed a hard, brittle polyester resin. This polyester resin is hereinafter referred to as Resin A.

Preparation of Resin B

The following compounds were place into a 5-liter flask equipped with a stirrer, thermometer, nitrogen inlet tube, and distillation column:

| COMPOUND | AMOUNT (grams) |
|---|---|
| 1,4-Cyclohexanedimethanol | 1183 |
| Tris(2-hydroxyethyl)isocyanurate | 135 |
| Isophthalic acid | 1379 |
| Dibutyl tin oxide | 2.4 |
| Triisodecylphosphite | 2.4 |

A nitrogen stream was passed over the top of the compounds while the temperature was raised to about 230° C. After the compounds had melted, the nitrogen stream was placed below the surface of the mixture. The mixture was held at about 230° C. for about 11 hours. During this period, the water of condensation was removed from the mixture through the distillation column.

After about 11 hours, the reactor's contents were poured onto metal trays and allowed to cool to room temperature. When cooled, the contents formed a hard, brittle polyester resin. This polyester resin is hereinafter referred to as Resin B.

Preparation of Resin C

The following compounds were place into a 5-liter flask equipped with a stirrer, thermometer, nitrogen inlet tube, and distillation column:

| COMPOUND | AMOUNT (grams) |
|---|---|
| Hydroxyfunctional acrylic[1] | 268 |
| Methylisobutyl ketone | 268 |

[1] Commercially available from S.C. Johnson under the tradename SCX-804.

A nitrogen stream was passed over the top of the compounds while the temperature was raised to about 70° C. Mixing continued until a homogeneous solution was formed. This acrylic resin solution is hereinafter referred to as Resin C.

Example 3

Preparation of Coating Compositions

This Example demonstrates the preparation of several coating compositions. Each of these coating compositions were made with an isocyanate-based compound encompassed by the present invention.

Preparation of Powder Coating Compositions

The following compounds were place into separate 5-liter flasks, each being equipped with a stirrer, thermometer, nitrogen inlet tube, and distillation column:

| COMPONENT | Coating A Amount (grams) | Coating B Amount (grams) | Coating C Amount (grams) | Coating D Amount (grams) | Coating E Amount (grams) | Coating F Amount (grams) |
|---|---|---|---|---|---|---|
| Crosslinker A | — | 71 | 71 | — | — | — |
| Crosslinker B | 71 | — | — | 71 | 71 | — |
| Crosslinker C | — | — | — | — | — | 71 |
| Polymer A | 336 | 336 | — | — | — | 336 |
| Polymer B | — | — | — | — | 336 | — |
| Hydroxyfunctional acrylic[1] | — | — | 260 | 260 | — | — |
| Flow additive[2] | 4 | 4 | 4 | 4 | 4 | 4 |
| Degassing agent[3] | 4 | 4 | 4 | 4 | 4 | 4 |
| Carbon black | 6 | 6 | 6 | 6 | — | 6 |
| Calcium carbonate | 180 | 180 | 180 | 180 | — | 180 |

[1] Commercially available from S.C. Johnson under the tradename SCX-804.
[2] A conventional acrylic flow additive commercially available from Solutia under the tradename PL 200 ™.
[3] A conventional degassing agent commercially available from SNIA UK under the tradename BENZOIN ™.

Coatings A–F were all prepared in essentially the same manner. Specifically, all materials were weighed out and ground to a sand-like consistency with a PRISM™ high speed mixer. The ground material was then extruded on a 19 mm BAKER-PERKINS™ extruder at 100° C. After the extrudate was permitted to cool, it was ground to an average particle size of about 30 microns on a HOSAKAWA™ ACM 1 grinder.

Preparation of Liquid Coating Compositions

The following compounds were mixed together in a 5-liter flask, at room temperature and in the order set out below:

| COMPOUND | AMOUNT (grams) |
|---|---|
| Resin C | 125 |
| Crosslinker A | 35 |
| Methylisobutyl ketone | 75 |
| Xylene | 25 |

The resulting liquid mixture is hereinafter referred to as Coating G.

Example 5

Performance Results of Coatings

This Example demonstrates the results of testing and evaluating Coatings A–G to determine their level of cure.

In this Example, Coatings A–F were all applied to a metal substrate, cured and tested in essentially the same manners. Specifically, Coatings A–F were individually applied to separate metal substrates by electrostatic spray application at 80 kV with a NORDSON™ II Versa spray system to a thickness of 2.5 mil. After being applied, the coatings were all cured at 380° F. for about 20 minutes.

On the other hand, Coating G was applied to a metal substrate, cured and tested in the following manner. Coating G was drawn over a chrome treated aluminum panel to a dry coating weight of about 8.3 mg/in$^2$. The coated aluminum panel was baked 232° C. in a gas-fired oven for 10 minutes.

The film produced from Coatings A–G were then tested to determine whether they had cured. To determine whether curing had occurred, the films were rubbed with methyl ethyl ketone (MEK) in accordance with ASTM D5402-93. The results are set out below:

| COATING | A | B | C | D | E | F | G |
|---|---|---|---|---|---|---|---|
| MEK Rubs | +200 | +200 | +200 | +200 | +200 | +200 | 70 |

With regard to Coatings A–F, due to their being a powder, they were applied at a relatively thick film build when compared to Coating G which was a liquid. For coatings applied at the film build of Coatings A–F, their ability to withstand over 200 MEK rubs represented that they had fully cured. On the other hand, for coatings applied at the film build of Coating G, their ability to withstand 70 MEK rubs represented that they had fully cured.

The above demonstrates the utility of the present invention. Specifically, the isocyanate-based compounds of the present invention resulted in fully curing the coating compositions into which they were incorporated.

Having now fully described this invention, it will be apparent to one of ordinary skill in the art that many changes and modifications can be made thereto without departing from the spirit or scope of the invention as set forth herein.

That which is claimed is:

1. An isocyanate-based compound comprising a polyfunctional isocyanate which is at least partially blocked with a mixture of a polyhydroxy aromatic compound and a hydroxy-functional ester compound, wherein the polyhydroxy aromatic compound comprises at least one compound having at least one of the following structures:

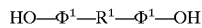

HO—$\Phi^1$—$R^1$—$\Phi^1$—OH where $\Phi^1$ consists of a phenylene group, and $R^1$ is an alkylene group having 0 to 4 carbon atoms, or

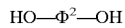

HO—$\Phi^2$—OH where $\Phi^2$ consists of a phenylene group or a naphthylene group, and wherein said hydroxy-functional ester compound is selected from at least one of methyl 4-hydroxybenzoate and methyl 3-hydroxybenzoate.

2. An isocyanate-based compound as recited in claim 1 comprising at least one triisocyanate.

3. An isocyanate-based compound as recited in claim 1, wherein the polyhydroxy aromatic compound comprises at least one compound selected from the group consisting of: diphenols, dihydroxynaphthalene hydroxy phenols, and derivatives thereof.

4. An isocyanate-based compound as recited in claim 1, wherein the ratio of the polyhydroxy aromatic compound to the hydroxy-functional ester compound ranges from about 0.01:1 to about 1.4:1.

5. An isocyanate-based compound comprising a polyfunctional isocyanate which is at least partially blocked with a mixture of a polyhydroxy aromatic compound and a hydroxy-functional ester compound, wherein the hydroxy-functional ester compound is selected from at least one of methyl 4-hydroxybenzoate and methyl 3-hydroxybenzoate.

6. An isocyanate-based compound as recited in claim 5 comprising at least one triisocyanate.

7. An isocyanate-based compound as recited in claim 5, wherein the polyhydroxy aromatic compound comprises at least one compound selected from the group consisting of: diphenols, dihydroxynaphthalene hydroxy phenols, and derivatives thereof.

8. An isocyanate-based compound as recited in claim 5, wherein the ratio of the polyhydroxy aromatic compound to the hydroxy-functional ester compound ranges from about 0.01:1 to about 1.4:1.

* * * * *